United States Patent

[11] 3,604,612

[72] Inventors Ford S. Miller;
Jerome W. Nelson, both of Houston, Tex.
[21] Appl. No. 764,191
[22] Filed Oct. 1, 1968
[45] Patented Sept. 14, 1971
[73] Assignee CRC-Crose International, Inc.
Houston, Tex.

[54] ORBITAL TRACK-TRAVELING CARRIAGE MECHANISM FOR PERFORMING WELDING AND OTHER PHYSICAL OPERATIONS
13 Claims, 6 Drawing Figs.

[52] U.S. Cl..................................... 228/45,
219/60.1, 228/29, 266/23, 269/287
[51] Int. Cl....................................... B23k 37/02
[50] Field of Search............................ 228/29, 25,
45; 219/60.1, 126; 269/287; 266/23

[56] References Cited
UNITED STATES PATENTS
3,135,850 6/1964 Scheller et al. ............... 219/60.1
3,176,897 4/1965 Tucker.......................... 228/29
3,179,781 4/1965 Ross et al...................... 219/60.1
3,220,629 11/1965 Anderson...................... 228/25
3,266,701 8/1966 Peignen........................ 228/29 X
3,380,148 4/1968 Nelson et al................... 228/29 X Primary Examiner—John F. Campbell
Assistant Examiner—Robert J. Craig
Attorney—Edwin M. Thomas ABSTRACT: A traveling carriage adapted to support and guide a welding head or analogous tool is supported and guided on a flexible track arranged for securing in tension to and conforming with a supporting workpiece, such as a pipeline girth joint. The carriage has two widely spaced guide rolls on one side and a traction roll and closely positioned guide roll on the other. Multiple carriages, each carrying an arc-welder or equivalent, can be supported on a single track which, in turn, can be mounted on flat or other surfaces as well as cylindrical ones.

INVENTORS
FORD S. MILLER
JEROME W. NELSON

BY
ATTORNEY

ORBITAL TRACK-TRAVELING CARRIAGE MECHANISM FOR PERFORMING WELDING AND OTHER PHYSICAL OPERATIONS

BACKGROUND AND PRIOR ART

In U.S. Pat. No. 2,705,629 to Miller, one of the present inventors, a track and orbital carriage system is described for working on large pipes. It comprises a guide track provided with spacers, adapted to fit around and fasten to a pipeline. Around this track a tool-supporting carriage, specifically one carrying a cutting or blowtorch unit, is adapted to be moved manually. The track provides a predeterminable path of travel in order that the torch may be used, specifically, for cutting a bevel-end surface on the pipe. The apparatus described in said patent has advantages and has been quite successful commercially. The apparatus there described is not a high precision tool, is not self-driven and is not intended or designed for the specific purposes of the present invention. The present invention, however, utilizes some of its features and includes several improved features.

Other devices have been proposed for carrying cutting tools, painting tools, etc., along predetermined paths which may be either straight or curvilinear. In general, these devices have not met the specific needs for which the present invention has been designed, such as means for closing the ends of the track member with precision, and holding them in perfect alignment, means by which the carriage may be accurately guided across a gap in the track, precision means by which it can be readily attached to or detached from the track, etc. The present invention embodies several features, both in the track and in the carriage which is designed to run thereon under its own power. It includes improved means for attaching and removing the carriage to and from the track, etc. A particular feature is the use of a single-wheel drive means together with a combination of guide rollers by which the carriage can be accurately and automatically transversed around the circumferential path to perform a particularly difficult operation, such as a finish girth-weld between two adjoining sections of annular members. Typical members to be welded comprise, for example, large steel pipes, e.g. pipes of 24 to 42 inches or more in diameter, such as are used for large gas mains and analogous tubular lines designed for large-volume transportation of fluids.

DESCRIPTION OF PREFERRED EMBODIMENT

Figure 1:
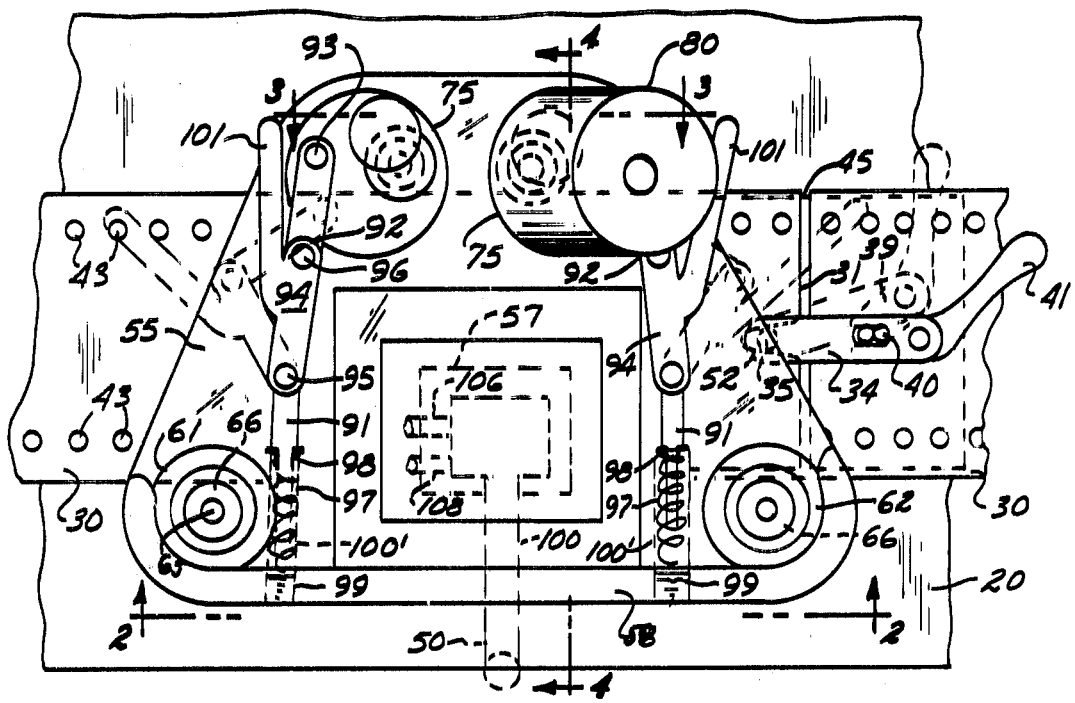
FIG. 1 shows a plan view of the apparatus, the track being shown only fragmentarily, as installed on an annular member such as a large steel pipe, the latter being shown only fragmentarily.

Although the invention is not necessarily limited to welding of pipelines and similar structures, it is particularly designed for such operations and will be described in connection with such. It can be used, at least in some of its aspects, in welding joints on flat or nonuniformly curved surfaces. As shown in FIG. 1, a large pipe 20, usually of steel, which may be 24 to 42 or 48 inches in diameter, or more, is to be welded end-to-end to another pipe length, not shown. The pipe 20 or workpiece also is used to support the mechanism which constitutes the present invention. This mechanism comprises a track 30 made up of a thin but sturdy flexible metal band of length sufficient to reach around the periphery and have its ends meet or nearly so. The ends should not come quite into tight abutment; otherwise the band cannot be tightly secured to the pipe. Note the gap 31, FIG. 1, also 31a, 31b, FIG. 6. The ends of the band may be staggered to form a Z-shaped joint, as indicated at 32 and 33 in FIG. 6, or they may be square as in FIG. 1. These parts are held together by a connecting link 34, preferably having one end pivotally mounted on a pin 35, and the other arranged for tightening on a pin 36 on the opposite end portion 37. With this arrangement a bolt 37, threaded through the upturned end 38 of link 34, can be adjusted to various positions to tighten or loosen the joint, in effect varying the length of link 34. Alternatively, the other end of the link 34, as shown in FIG. 1, is arranged to be tightened by suitable toggle means such as a pivoted lever 39 engaging a pin 40 secured to the band 30, having a handle 41 for quick tightening and release. It will be understood that this link and/or its end-fastenings may be made adjustable, by being eccentrically mounted, if desired. Each of these arrangements must provide means whereby the band may be tightly secured around the supporting workpiece or pipe element 20.

Figure 2:
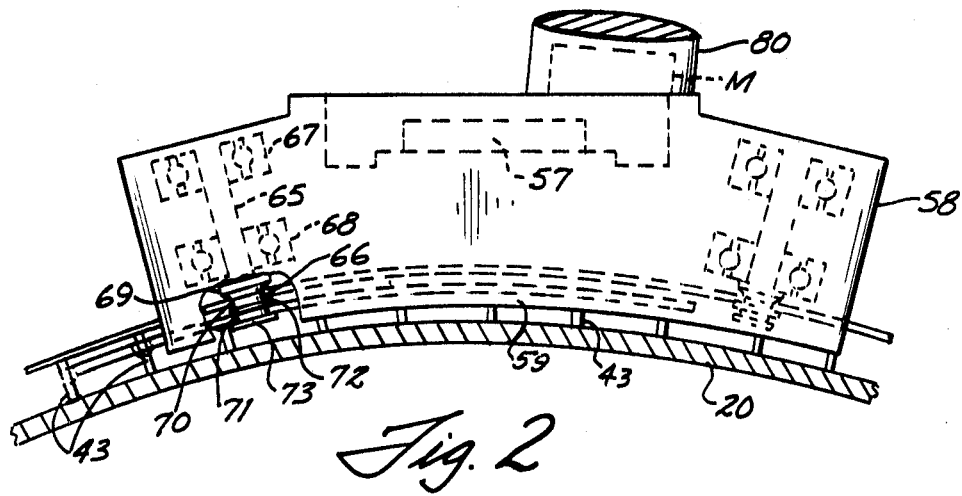
FIG. 2 shows a side view of the apparatus, with a transverse section through the supporting element, taken substantially on the line 2—2 of FIG. 1, looking in the direction of the arrows.
Figure 3:
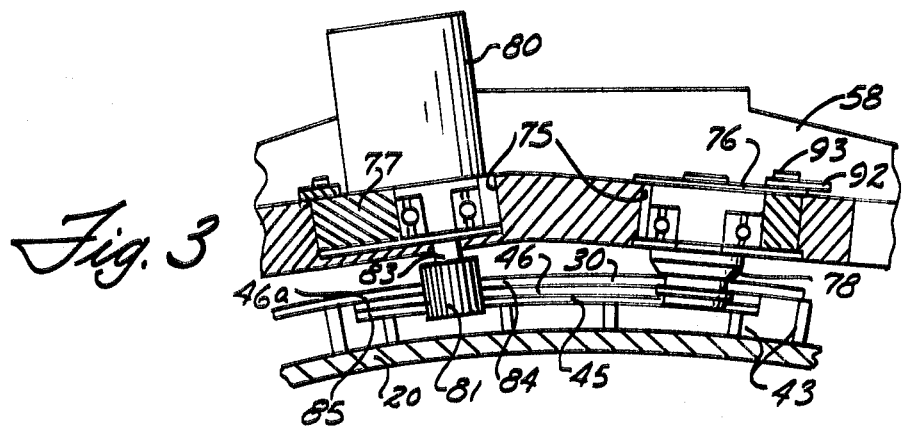
FIG. 3 shows a rear side view of the carriage unit and a fragmentary sectional view of the track and the supporting workpiece, taken substantially along line 3—3 of FIG. 1.
Figure 5:
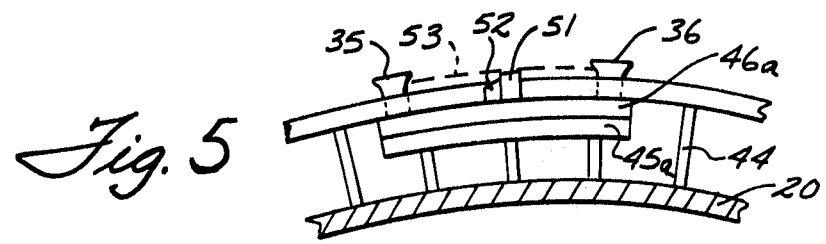
FIG. 5 is a fragmentary sectional view through the track joint, showing a modification.

Along the band 30, at intervals closely spaced throughout its full circumference, there is provided a series of supporting spacers 43, FIGS. 2, 3. These may be rows of pins arranged at frequent intervals to support the sides of the band 30 so that it remains essentially round as it is stretched about the pipe. Alternatively, and preferably, they may be transverse bars 44 secured at intervals to member 30 by bolts or rivets, as shown in FIG. 5. The pins 43 or bars 44 serve as spacers to set the band a predetermined distance away from the supporting surface. This permits flanged wheels on the carriage to extend below the track edges. In a typical case this distance may be of the order of one-fourth to three-fourths of an inch or more or less.

Figure 4:
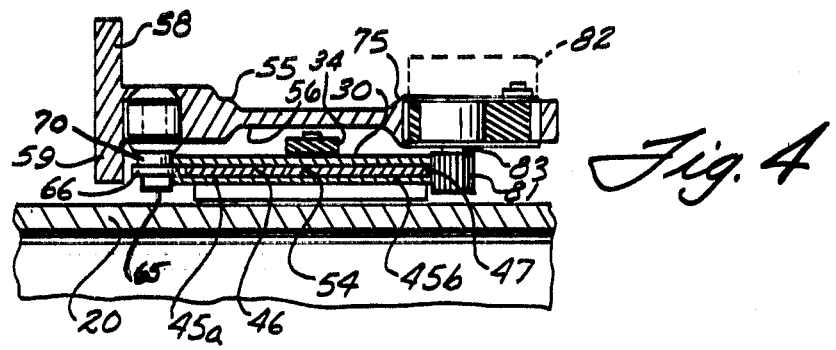
FIG. 4 is a sectional view through track, carriage, and the supporting workpiece, taken substantially along line 4—4 of FIG. 1.
Figure 6:
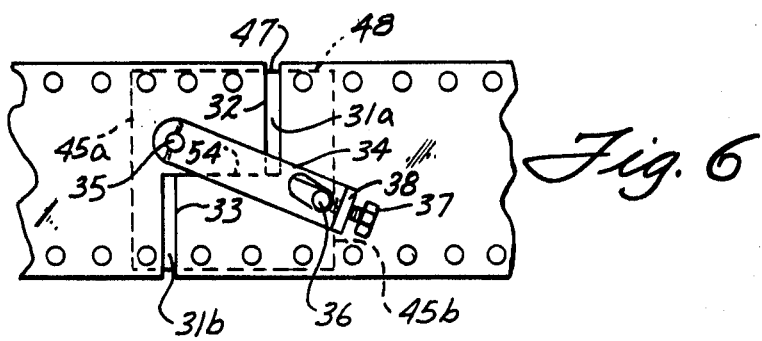
FIG. 6 is a fragmentary plan view of a portion of the track joint, showing another modification.

The joint between the ends of the band or track member 30 must be bridged in order that the carriage, as described below, may travel around it without being displaced or misaligned as it crosses the joint. For this purpose, at least one end of band 30 is provided with a bridging member 45 which has its outer edge aligned with the edge of track 30 but is spaced therefrom by a spacer member 46 which sets back a slight distance from the outer edge as indicated at 47, FIG. 4. See also the dotted lines 48, FIGS. 1 and 6. This arrangement is made to accommodate drive and guiding rollers on the carriage, as will be described more fully below. Separate bridging members 45a and 45b, each of one-half the track width, are preferably attached to the opposite ends of track 30, as best shown in FIG. 6; see also FIG. 4. In this case the parallel edges 54 are in firm abutment with each other but may slide relatively, as explained below and shown in FIG. 6. However, a full-width bridging member 45a may be used, as shown in FIG. 4, if desired, in which case the two ends must be guided into perfect alignment laterally, as the band is tightened into place. For this purpose, an outwardly or upwardly projecting pin 51 is fixed to the bridging member 45a which, together with its spacer element 46, is fixed to one end (at the left as seen in FIG. 5) of the band 30. The other end of band 30 is slotted at 52, see also FIG. 1, so that the two ends are held in alignment as they are drawn together by a tightening means represented by the dotted line 53. It will be understood that the tightening means may be of the toggle-type as in FIG. 1, or of the hinged link-and-bolt-type, as in FIG. 6.

In FIG. 6, the two aligned edges 54 of the one-half-width bridging members 45a and 45b are held tightly but slidably against each other as the band is tightened, by placing the pins 35 and 36 in position on their respective ends and bridging elements so that the link 34 makes an acute angle with the aligned edges 54. When bolt 37 is tightened against pin 36, to draw the band ends together, the edges 54 are held firmly pressed together, although there is relative longitudinal sliding movement as the tensioning means is tightened. The spacers 43 or 44 keep the parts aligned in the vertical direction.

For a typical design the band 30 may have a width of as little as 3 or 4 inches or as great as 6 to 10 inches, if desired. On a typical installation, involving a pipe of diameter between 30 and 42 inches, a band about 5 to 7 inches wide has been found to be very satisfactory. By the simple tightening means 34, 36, or 39, 40, the band may be firmly secured and tightened around the supporting member 20 with the pins 43 or bars 44 tightly pressed into engagement with the supporting surface so that there is no danger of slipping. If desired, both pins 43 and bars 44 may be used. By a simple gauging operation the band may be positioned in precise alignment with a plane-end surface of the pipe, or with any other locating element, and then tightened in place so that the carriage, which is to be supported on the track, will necessarily travel in a true plane, preferably and usually quite accurately perpendicular to the axis of the supporting member 20. Thus, in welding a pipeline, girth joint, for example, the band 30 is placed a precisely predetermined distance, e.g. 2 or 3 inches or so from the end of the pipe, so that the joint between the supporting pipe member 20 and the next adjoining and similar member, not shown, can be accurately followed by the tool 50, shown only diagrammatically on the carriage of FIG. 1.

It will be understood that the joint between member 20 and the next joint may already have been partially welded, for example by an internal partial weld previously formed by other apparatus constituting no part of the present invention. The preformed weld holds the parts firmly for the present operation. Otherwise, the two pipe sections 20, and the other one, must be held by some firm means, such as a heavy internal and/or external clamp, or by welding bridging elements, etc., while the joint is welded by the equipment of the present invention.

In the case mentioned above, where a partial weld has already been made, the line of the partial weld is the determining position with respect to which the band 30 must be accurately placed on the supporting member 20. As previously noted, any suitable gauge may be used for the purpose of securing proper alignment, or spacing of the band 30 from the end of pipe 30, as will be obvious to those skilled in the art.

A carriage unit, which is designed to travel on track or band 30, comprises a main base frame member 60, of roughly triangular or trapezoidal shape best shown in plan view in FIG. 1. This has an upturned flange element 58 on one side which is adapted to support a tool-carrying bracket, shown in dotted lines at 57. See particularly FIG. 2. The flange 58 also has a reinforcing flange portion 59 projecting below a main body member 55 which may be curved in gentle arc to lie approximately parallel to track 30 and workpiece 30. The main base element 55 thus is adapted to be supported in spaced position from and approximately parallel to the track member 30. It is designed to have enough clearance, e.g. at 56, FIG. 4, to clear the band-tightening devices 34. The base member 60 is wide enough to extend beyond either side of the track member a sufficient distance to support guiding and drive roller members which not only keep the carriage in proper alignment but also cause it to travel positively along the track or band member 30. These will next be described.

The frame member 60 comprises near its front side, FIG. 1, a pair of spaced boss members 61 and 62, each of which is bored to receive a shaft and ball-bearing assembly. Each of these assemblies mounts for free rotation a double-grooved guide roller 66. These are identical in construction and mounting, each having a shaft 65, upper ball bearing 67, lower ball bearing 68, enlarged beveled flange 69, upper groove 70, lower groove 71, and upper and lower rib or land elements 72, 73, respectively. These rollers preferably are mounted on precision ball bearings. The spacing distance along the track between the bosses 61 and 62 is such that the guide rollers 66 are set apart a sufficient distance to give a highly accurate directional guidance to the apparatus. For example, on a track fitted to a 36 or 42-inch pipe, spacing between the bosses 61 and 62, and the consequent spacing between the guide rollers on that side of the carriage, should amount to around 12° to 20° of arc, preferably at least 15° of arc. Thus, with a pipe radius of, say, 18 to 21 inches, the spacing between the two rollers 66 on one side of the carriage will be a distance at least of the order of 5 or 6 inches or more. Greater spacing of course provides greater accuracy of alignment in one respect. However, it is desirable to keep the carriage compact. The guide roller and drive on the opposite side of the carriage are mounted closer together, for reasons to be mentioned. The spacing should not be so great as to make the unit unwieldy.

The rollers 66 are mounted or formed on shafts 65 to project downwardly from the support base 60 a suitable distance, the bearing structure being such that the guide rollers can be freely rotated at all times. While precision ball bearings are preferred for mounting the rollers, this is not always absolutely necessary. It is desirable, however, to have them mounted in dustproof bearings for use in field operations such as pipeline welding where dirt and dust otherwise would be likely to cause rapid wear of ordinary journal bearings. Obviously, sealed ball or roller bearings of the precision type are more satisfactory than unsealed bearings.

On the other side of frame 60 are two large and identical openings 75, each adapted to receive an eccentric and bearing assembly 76 or 77. The two eccentrics are of identical size so that they can be interchanged, as will be explained below. One of them contains bearing, shaft, etc., for a guide roller 78, which is identical or substantially identical with guide roller 66. The other, however, mounts a drive unit, comprising a drive motor 80 which may be an electric motor or a fluid motor M, and a knurled drive roller 81. The latter is driven through gear-reduction mechanism contained in motor housing 82.

The knurled guide roller 81 is splined or otherwise drivingly attached to a shaft 83 driven by motor 80 at an appropriate speed to carry the carriage around the track while a weldment is being made. Such speed may be between about 10 and 100 inches per minute, in typical welding operations. The knurled roller is long enough to engage both the edge 84 of track 30 and the edge 85 of bridging element 45, or 45b; see FIGS. 3 and 4. Hence, when the drive roller passes the gap between the ends of band 30, it is still drivingly engaged therewith through the edge of the bridging member. Likewise, the guide rollers 66 on the other side of the track engage the edge of the bridging member by their lower grooves 71, the rib or land element 72 riding between the band 30 and the bridging member, as accommodated by spacer 46. See FIGS. 2 and 4, particularly. The lower flange or rib 73, FIG. 2, may be omitted and in fact is omitted in FIG. 4. In this case the element 72 is not a groove but merely a terminal cylindrical surface of the same diameter as groove roller element 70.

The guide roller 78, best shown in FIG. 3, which is on the same side of the track as drive roller 81, and fairly close thereto, is similar to guide roller 66 but is eccentrically mounted for lateral movement, as already mentioned. Both the guide roller 78 and the drive roller 81 are journaled in ball bearings for the same reasons and in the same general manner as already described in connection with rollers 66. Both eccentrics 76 or 77 are smoothly fitted into the large circular openings 75 in the carriage base member 60. The shafts of the respective rollers 78 or 81 are located far enough off center that rotation of the eccentric mounting in one direction will clear the ribs of lands of roller 78 from the edge of track 30, whereas rotation in the other direction will bring the rollers firmly against the track edge. These are, respectively, the release and working positions.

For rotating each of the eccentrics, a toggle mechanism is provided, although other means may be substituted if desired. These each consist of a compression spring-urged plunger 91, a link 92 connected pivotally to the eccentric at a pin 93, and a toggle lever 94 connected at 95 and 96 to the plunger 91 and the link 92, respectively. A spring 97 is held against a shoulder 98 on plunger 91 by a base plug 99 screwed into the bore 100' which accommodates the plunger. With this arrangement, the toggle is moved by its handle 101 in one direction to break the toggle and turn the eccentric to move the roller 78 or 81 away from track-engaging position. When swung the other way, toggle member 94 is brought into line between link 92 and plunger 91, placing spring 97 under compression to urge the eccentric into track-engaging position. It will thus be understood that the drive roller 81 is resiliently forced against the edging of track 30 with sufficient force to engage it with positive driving force. Guide roller 78 is similarly brought into locking engagement with ribs 72 and 73, or at least rib 72, under an edge, holding the carriage positively on the track.

With this arrangement, the drive roller may be released by rotating its eccentric, say 77, FIG. 3, while the guide roller 78 is still in locking position. By thus disengaging the drive, the carriage may be moved manually along or around track 30 without coming off the track. For semiautomatic welding this is highly advantageous. It permits the welder to run automatically from top to bottom on one side of a pipe. Then by releasing the drive roller eccentric, it can be lifted (along the track) back to the top for another downward welding pass. It is usually desirable to run a weld from top to bottom and not vice versa. However, by using a reversible motor, the unit can be run up as well as down under its own power.

Since welding large pipelines, in the top-to-bottom manner just described, requires operations on both sides, two carriages may be placed on a single track and in fact this is a preferred method of operation. In order to have both carriages (or "bugs" as they are sometimes called) start from a top central position, the drive roller eccentric may be placed at the right in one and at the left in the other, to prevent or reduce interference between the two operations. The operator on one side will have the toggle handle for the drive roller 81 handy to him and likewise on the other side.

While two units are preferred, a single one can of course be used to weld both sides, or plural units may be used on both sides, if desired. The type of welding head actually used forms no part of the present invention, but various uses and modifications are possible. For example, in one operation the welding unit may simply move in a straight line or plane to fill a narrow groove or space between work members which are to be joined. In another operation, a vibrating mount may be used for the welder, to make a zigzag or oscillating-weld pattern and thus fill a wider gap. Another operation may require a very wide amplitude of oscillation and slow movement ahead, to fill a very wide gap. Cam means, or other mechanism to produce the desired vibration, can be mounted alongside or even incorporated in or upon the track structure of this invention to obtain the required vibration, oscillation, variation of amplitude, etc. The hard knurled surface of drive roller 81 is adapted to engage in strong frictional driving relationship the edge of the track or guide band 30 opposite to that engaged by the rollers 66, without doing particular injury or causing excess wear to the edge surface so engaged. With this arrangement, driving rotation of the drive roller 81 will move the carriage along the track. In time, the edge of the band may itself become knurled from the hard drive roller but this only improves the frictional engagement and usually is not objectionable. Shaft 74 is driven to move the carriage at an appropriate speed, up to 100 inches per minute or more, for example, through a gear-reduction mechanism of conventional type, not shown in detail. Driving power usually will be provided by an electric motor M, suitably connected by electric wiring to a source of electric power. The electric wiring permits ample travel. The arrangement is such that the motor 82 which stands up radially with respect to band 30, is carried around with the carriage and the wiring drapes behind it. Suitable means, not shown, may be provided to avoid wire entanglement or interference.

While the arrangement described is quite simple, it has been found in practice to be highly effective for its purpose. In use, an operating tool, shown here as a welding head 50, FIG. 1, is attached to flange 58 or may be secured by bolts or other means to the flat surface 110, FIGS. 1, 2. Suitable utility leads of conventional type, indicated at 106 and 108, may be provided for bringing in shielding-gas and electric current, respectively, to the welding head 50. The latter is of conventional type, well known in the art, and need not be described in detail. Means, not shown, may be provided for feeding a consumable wire electrode through the welding head or "contact tube" 50.

Means for precision-feeding wire or other electrode to the welding head, of obvious or various types well known in the art, may be provided so that the groove or space between the abutting pipe ends or other workpieces is filled with molten metal by the traveling electric arc as the carriage travels in orbital fashion around the joint to be welded.

In a typical case, the pipe joint may be first welded partially from the inside to secure the parts 20 and 40 together and to fill the inner part of the kerf or juncture between the adjoining pipe sections with weld metal. Ordinarily this first pass internal weld fills only a fraction of the thickness of the pipe, say one-fourth to one-half its full thickness. The remainder of the joint, not welded from the inside, is welded from the outside. The abutting pipe ends may be preshaped to provide them with a V-notch or other configuration, thus to facilitate the desired welding operation. With such an arrangement, the external welding member 100 may be passed one or several times up and down or around the periphery of the joint to fill the gap and thus complete the weld from the outside.

To avoid complexity in the handling of the utilities, that is gas and electric supply through hose and electric cable to the welding head, it usually is desirable to rotate the carriage around only a part of its orbit, first in one direction and then in the other. The apparatus may be designed to perform one complete revolution or even more, and then reverse, e.g. to pass through a complete revolution in the other direction. Ordinarily, it is not practical to have the orbital unit travel continuously more than one turn around the pipe in one direction because of the difficulty of handling the utility lines which would become wound up and tangled. Manual reversal in the way already described is usually preferable. However, the motor 82 can be and preferably is of the reversible type so that the carriage can be driven in either direction. Controls for the motor, for starting, stopping, reversing, etc., may be mounted on the carriage itself or may be carried from there to a suitable control panel separately mounted. These controls are not illustrated, such description being unnecessary for those skilled in the art.

The upturned flange 52 to which the welder unit 100 is attached may be used to mount other devices in lieu of a welder unit, if desired. The track may be used to support cutter or cleaning tools, e.g. for preparing or cleaning the joint before welding. Means for applying flux preparatory to welding, or applying coating material to a finished weld, or various other operations, may be mounted and driven similarly. A small rotary cutting or grinding tool may be attached to the carriage and driven by its own power source to cut or grind away rust or irregularities in the surface and otherwise to expose a clean metal surface preparatory to welding. In this case, the same carriage may be used for both the cleaning operation and the eventual welding which completes the joint, by merely mounting different tools on the carriage, as required.

The arrangement shown provides a highly accurate track and guidance system for orbitally moving tools of various sorts which, as previously noted, may be adapted to various kinds of operations of different physical natures, such as may be required in building pipelines or in working in various ways on other analogous annular workpiece structures.

It will be understood further that the invention is not at all limited to use on pipelines, or even to orbitally movable devices. The cylindrical surface need not be a right circular cylinder but may be of oval or some other generated configuration, as will be obvious to those skilled in the art. By suitable track mounting, it may be used on plane surfaces or on parallel rectilinear elements of cylindrical surfaces, etc. It is particularly suitable, though, for welding girth joints in large diameter pipelines. The important consideration is that in any case the track is to be mounted and spaced a predetermined distance from and in true parallelism with respect to the supporting surface, whatever its shape. As a result, the operating tool will be precisely aligned with respect to a desired position from or with respect to an end or other true surface of the work member, or with respect to a cut groove, or other marking or determining surface which may be formed therein.

It is intended by the claims which follow to cover the features shown and/or described above, and their equivalents, and such variations as would suggest themselves to those skilled in the art, as broadly as the prior art properly permits.

What is claimed is:

1. In a system of the character described, the combination which comprises an elongated flexible sheet metal band having parallel side edges and cooperating fastening means at its ends adapted to hold said band in tight securement around and completely encircling a large cylindrical workpiece such as a large-diameter pipe, bridging means secured to said band and arranged to overlap the junction between said ends when they are secured together to form a continuous, endless track encircling said workpiece, a carriage adapted to travel on said track, means on said track for spacing said track from but concentric with the cylindrical surface of the workpiece, nondriven, plural spaced guide rollers on one side of said carriage adapted to engage one edge of said band to retain said side of the carriage against displacement from said track, a driven roller and a guide and retainer roller arranged as a pair to engage the other edge of said track, separate means for moving said drive roller and said last-named guide roller independently into and out of track-engaging position with respect to said other track edge, the arrangement of all such rollers being such as to constrain the carriage to movement around said workpiece in a plane and path accurately parallel to the plane and path of one of said band edges, and means for mounting a functional tool on said carriage.

2. Combination according to claim 1 wherein the driven roller is mounted on an eccentric support to provide a change in transverse dimension with respect to the guide rollers.

3. Combination according to claim 1 which includes adjustable tensioning means for drawing the band ends together.

4. Combination according to claim 3 wherein the carriage is adapted to support a welding head for performing a peripheral welding operation parallel to a track edge on said workpiece.

5. Combination according to claim 1 which comprises an eccentric mounted drive roll and a separate eccentric mounted guide and retainer roll operable to engage said other edge portion of the track, and wherein the pair of guide rolls adapted to engage the first edge portion of the track are also retaining tools, whereby the carriage can be retained on and guided along the track irrespective of engagement or disengagement of the driven roller with said track.

6. Combination according to claim 1 wherein at least one end of the track is provided with a spaced bridging element to guide the carriage past a gap where the ends of the track are joined so that the carriage can travel past said gap without interference or displacement.

7. Combination according to claim 6 wherein the guide and retaining rollers have multiple elements to engage both the track and the bridging element.

8. Combination according to claim 1 wherein a bridging element is secured to one end of the track and an aligning means is provided to insure accurate alignment of the track ends when they are joined together to encircle a cylindrical workpiece.

9. Combination according to claim 1 wherein each end of the track is provided with a bridging element and wherein the tensioning means is arranged to draw said bridging elements into firm but sliding edge-abutting relationship to insure accurate alignment of the track ends when they are drawn in tension about a cylindrical workpiece.

10. Combination according to claim 1 wherein said the guide track is adapted to be drawn in tension around a cylindrical hollow workpiece such as a joint in a pipeline, wherein tensioning means are provided on the ends of the guide track to draw said ends together and mount the track firmly on said workpiece a predetermined distance from an end of said workpiece, wherein the carriage is adapted to be driven by its own power around at least a portion of the periphery of said workpiece, and wherein the carriage is adapted to carry a welding head to weld another hollow workpiece to said end of said first named workpiece.

11. Combination according to claim 10 wherein bridging means provide accurate transverse alignment between the ends of the track and wherein said bridging means also provide accurate guidance without misalignment for the carriage across any gap between said track ends.

12. Combination according to claim 1 which comprises cooperating edge portions on the band parallel to the side edges and to each other, said cooperating edge portions being adapted to slide along each other and maintain parallelism between the band side edges as the band is closed around a cylindrical workpiece.

13. Combination according to claim 12 which comprises tensioning means adapted to produce a force component transverse to the parallel edges of the band to keep said cooperating edge portions in tight contact as tension is applied.